Patented Aug. 12, 1941

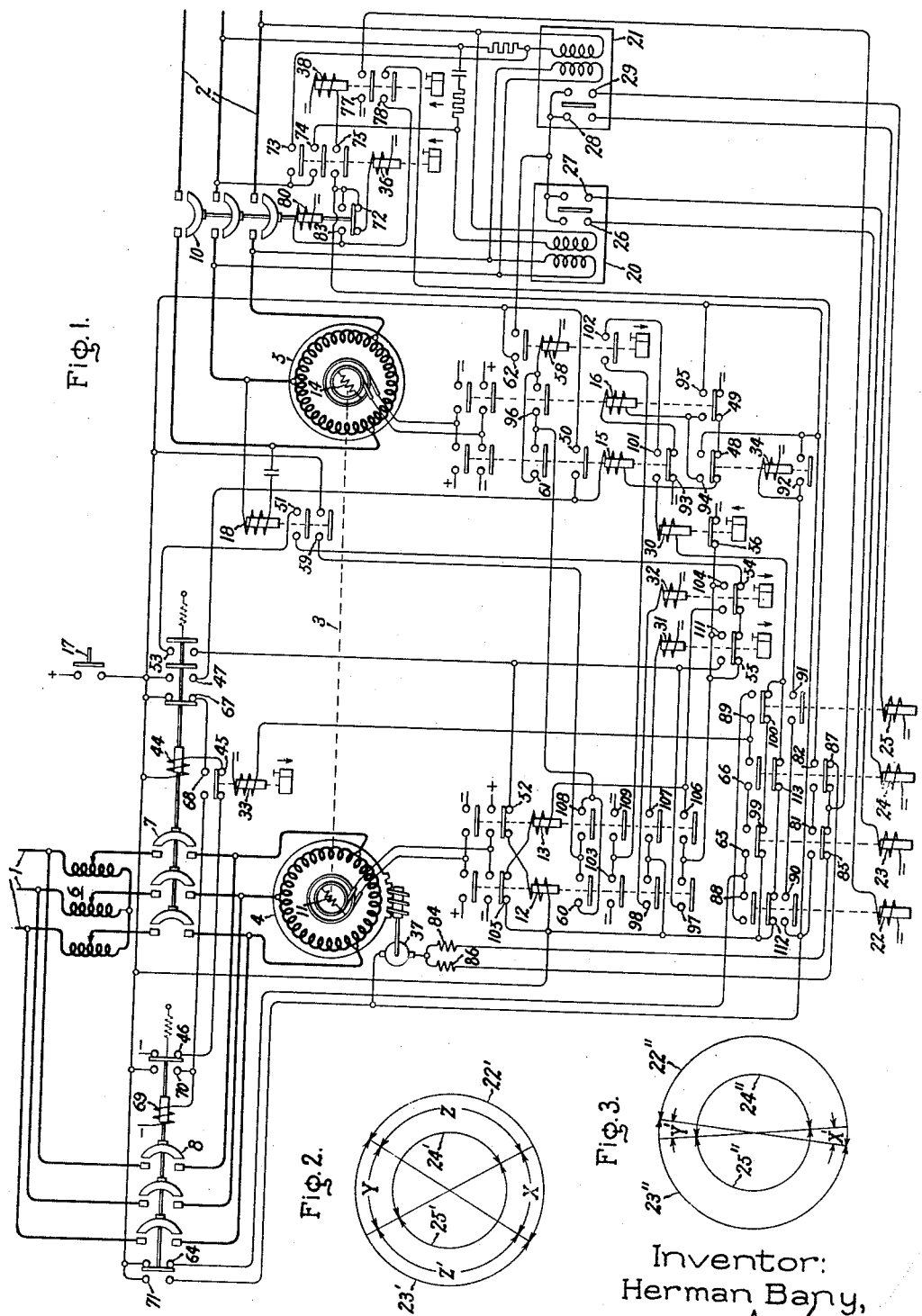

2,252,453

UNITED STATES PATENT OFFICE 2,252,453

AUTOMATIC CONTROL EQUIPMENT FOR SYNCHRONOUS FREQUENCY CONVERTERS

Herman Bany, Lansdowne, Pa., assignor to General Electric Company, a corporation of New York Application December 27, 1940, Serial No. 371,909

14 Claims. (Cl. 171—118)

My invention relates to automatic control equipments for synchronous frequency converters which interconnect two alternating current circuits of different frequencies, and one object of my invention is to provide an improved arrangement of apparatus for controlling a synchronous frequency converter which has one of its synchronous machines connected to one of the alternating current circuits so that the proper phase relation between the voltages of the disconnected machine and the circuit to which it is to be connected can be established. Another object of my invention is to provide an improved arrangement of apparatus whereby the proper phase relation between the voltages of the disconnected machine and the circuit to which it is to be established can be established quickly, and with only a small angular rotation of the stator of one of the machines relative to its foundation.

In accordance with my invention, the converter is started by connecting one of the machines as an induction motor to one of the alternating current circuits, preferably through suitable voltage reducing means, and applying excitation to the connected machine when the converter reaches a predetermined speed. Then the excitation of the connected machine is periodically reversed until the voltage of the disconnected machine is within a predetermined phase range of the voltage of the other alternating current circuit. Then full voltage is applied to the connected machine, if it has been started by having a relatively low voltage connected thereto, and the other machine is connected to the other circuit.

In cases where one of the machines is provided with stator shifting means, I prefer not to have to reverse the excitation of the connected machine until the voltage of the disconnected machine is brought within the relatively small phase range within which it is necessary to bring the voltage in order to make the set take its share of the load because of the relatively large number of reversals of excitation that may have to be effected and the relatively long time that may have to elapse before the proper phase relation of the voltages is obtained. In such cases I prefer to reverse the excitation of the connected machine only until the voltage of the disconnected machine is brought within a predetermined range which can be corrected to the proper smaller range by the operation of the stator adjusting means. Then after full voltage is applied to the connected machine, and the stator adjusting means is automatically adjusted to establish the proper phase relation between the voltages of the other machine and the other circuit for connecting the other machine to the other circuit.

My invention will be better understood from the following description when taken in connection with the accompanying drawing Fig. 1 of which illustrates an automatic synchronous frequency converter control equipment embodying my invention, and Figs. 2 and 3 of which are explanatory diagrams, and the scope of my invention will be pointed out in the appended claims.

Referring to the drawing, 1 and 2 represent two alternating current circuits of different frequencies which are interconnected electrically in any suitable manner (not shown) so that a constant frequency relation is maintained between the two circuits. 3 represents a synchronous frequency converter comprising two synchronous machines 4 and 5 which have their respective rotors mechanically connected to a common shaft. For the purpose of this description, it will be assumed that 4 is a motor and 5 is a generator, but it will be obvious that the function of each machine will depend upon the direction of power flow through the converter. The armature winding of the synchronous motor 4 is arranged to be connected to the alternating current circuit 1 through suitable voltage reducing means, shown as an autotransformer 6, by a suitable switch 7. The armature winding of the synchronous motor 4 is also arranged to be connected directly to the alternating current circuit 1 by a suitable switch 8. The armature winding of the synchronous generator 5 is arranged to be connected to the alternating current circuit 2 by a suitable switch 10. The field winding 11 of the synchronous motor 4 is arranged to be connected to a suitable source of excitation by means of the reversing switches 12 and 13, and similarly the field winding 14 of the synchronous generator 5 is arranged to be connected to a suitable source of excitation by means of the reversing switches 15 and 16.

For the purpose of this description, it is assumed that the frequency of the alternating current circuit 1 and of the synchronous motor 4 is lower than the frequency of the alternating current circuit 2 and the synchronous generator 5.

In the embodiment of my invention shown in Fig. 1, the converter 3 is started by closing the switch 7 so that the motor 4 starts and accelerates as an induction motor. The closing of the switch 7 is effected in response to the operation of a control switch 17 which obviously may be controlled in any suitable manner. The closing of the switch 7 also effects the closing of the field switch 15 so that the field winding 14 of the generator 5 is energized. When the speed of the converter 3 reaches a predetermined value, suitable speed responsive means, shown as a frequency relay 18 which is connected across one phase of the armature winding of the generator 5, operates to effect the closing of the field switch 12 so that the motor field winding 11 is energized to pull the motor 4 into synchronism while the motor remains connected to the alternating current circuit 1 through the voltage reducing means 6. Then, in response to the phase relation existing between the voltage of the synchronous generator 5 and the alternating current circuit 2, the field switches 12 and 13 are alternately closed to cause the motor 4 to slip a pole until a predetermined phase relation is established between the voltages of the generator 5 and the alternating current circuit 2. Then the switch 7 is opened and the switch 8 is closed to connect the armature winding of the motor 4 directly to the alternating current circuit 1. The stator of one of the synchronous machines, preferably the low frequency machine 4, is then automatically shifted with respect to its foundation so as to bring the voltage of the generator 5 substantially into phase with the voltage of the circuit 2. When the proper phase relation is established between these voltages, the switch 10 is automatically closed to connect the generator 5 to the circuit 2.

For controlling the alternate operation of the reversing field switches 12 and 13 until the desired phase relation exists between the voltages of the generator 5 and the circuit 2, I provide the phase responsive relays 20 and 21 and the control relays 22, 23, 24 and 25. The relay 20 is connected to the armature circuit of the generator 5 and to the circuit 2 in any suitable manner, examples of which are well known in the art, so that, during each slip cycle, this relay maintains its contacts 26 closed so as to complete an energizing circuit for the control relay 22 during a predetermined phase range of the voltage of generator 5 with respect to the voltage of the circuit 2, such for example as the range 22' in Fig. 2, and so that it maintains its contacts 27 closed and thereby completes an energizing circuit for the control relay 23 during the remaining portion of each slip cycle, such for example as the range 23' in Fig. 2. The relay 21 is connected to the armature circuit of the generator 5 and to the alternating current circuit 2 in any suitable manner, examples of which are well known in the art, so that, during each slip cycle, it maintains its contacts 28 closed and thereby completes an energizing circuit for the control relay 24 during a different phase range of the voltage of the generator 5 with respect to the voltage of the circuit 2, such for example as the range 24' in Fig. 2, and so that it maintains its contacts 29 closed and thereby completes an energizing circuit for the control relay 25 during the remaining portion of each slip cycle, such as the range 25' in Fig. 2.

From Fig. 2, it will be seen that the phase range of the voltage of the generator 5, with respect to the voltage of circuit 2, during which the relays 22 and 25 are simultaneously energized and deenergized and during which the relays 23 and 24 are simultaneously energized and deenergized, depends upon the calibration of the relays 20 and 21. When these relays 20 and 21 are calibrated so that they have the characteristics mentioned above and shown in Fig. 2, relays 23 and 24 are simultaneously energized and the relays 22 and 25 are simultaneously deenergized during the phase range Y, which is a small range near phase coincidence; relays 22 and 25 are simultaneously energized and relays 23 and 24 are simultaneously deenergized during the phase range X, which is a small range near phase opposition of the voltages; relays 22 and 24 are simultaneously energized and relays 23 and 25 are simultaneously deenergized during the phase range Z and the relays 23 and 25 are simultaneously energized and the relays 22 and 24 are simultaneously deenergized during the phase range Z' of the generator voltage relative to the voltage of the circuit 2.

During the phase range Z', when the relays 22 and 24 are simultaneously deenergized, and also during the phase range Z, when the relays 23 and 25 are simultaneously deenergized, energizing circuits are periodically completed for a time relay 30 which, after being energized for a predetermined time, effects in cooperation with the time relays 31 and 32, in a manner hereinafter described, the opening of whichever of the field switches 12 and 13 is closed and the subsequent closing of the other of these field switches. In this manner the field switches 12 and 13 are alternately operated to reverse the field excitation of the motor 4 and cause it to slip a pole until the voltage of the generator 5 is brought within either the phase range X or Y shown in Fig. 2.

In order to effect the opening of the switch 7 and the closing of the switch 8 when the voltage of the generator 5 is within the phase range X or Y with respect to the voltage of the circuit 2, I provide a transfer relay 33 which is arranged to be energized in response to the simultaneous energization of the control relays 22 and 25 during the phase range X of the generator voltage and in response to the simultaneous energization of the control relays 23 and 24 during the phase range Y of the generator voltage. The transfer relay 33, when energized, is arranged to effect the opening of the switch 7 and the subsequent closing of the switch 8.

When the switch 8 is closed in response to the generator voltage being within the phase range X, namely when it is nearly in opposition to the voltage of the circuit 2, it is necessary to reverse the field excitation of the generator 5 so as to bring the generator voltage within the phase range Y, namely near phase coincidence with the voltage of the circuit 2. For accomplishing this result, I provide a control relay 34, which is arranged to be energized in response to the closing of the switch 8 if at the same time the control relays 22 and 25 are simultaneously energized thereby indicating that the generator voltage is within the phase range X. The relay 34, when energized, effects the opening of the field switch 15 and the closing of the field switch 16 so as to reverse the field excitation of the generator 5 and thereby cause the generator voltage to fall within the phase range Y.

After the switch 8 is closed, I recalibrate the phase responsive relays 20 and 21 so that they have the characteristics shown in Fig. 3 whereby the relays 22, 23, 24 and 25 are respectively energized during the phase ranges 22", 23", 24" and 25" of the generator voltage. This recalibration is effected by means of a relay 36 which is energized in response to the closing of the switch 8 and which varies in any well-known manner the electric constants of some of the winding circuits of the phase responsive relays 20 and 21 so as to obtain the desired operating characteristics of these relays. From Fig. 3, it will be seen that the phase range Y' is much smaller than the range Y in Fig. 2 so that it may be necessary to adjust the generator voltage after the relays are recalibrated in order to bring the generator voltage within the phase range Y'. This result is accomplished by shifting the stator of one of the machines, which in the particular arrangement shown in the drawing is the motor 4, relatively to its foundation by means of a reversible motor 37 which is arranged to be controlled by the phase responsive relays 20 and 21, after they are recalibrated, so that the voltage of the generator 5 is brought within the phase range Y' of Fig. 3. If the generator voltage vector is to the right of the phase range Y' in Fig. 3, it will be seen that the control relay 23 is deenergized, whereas if the generator voltage vector is to the left of the phase range Y', the control relay 24 is deenergized, but if the generator voltage vector is within the phase range Y', both of the control relays 23 and 24 are simultaneously energized. Therefore, I control the circuits of the motor 37 so that, when the control relay 24 is deenergized, the motor 37 is rotated in the proper direction to shift the stator of the motor 4 so as to bring the generator voltage within the phase range Y', and when the control relay 23 is deenergized, the motor 37 is rotated in the opposite direction to bring the generator voltage within the phase range Y'.

In order to prevent any shifting of the stator of the motor 4 until after the field reversing switch 16 has been closed, in case such an operation of the switch is required, I provide a time relay 38, which is energized in response to the closing of the switch 8 and which is arranged to prevent the circuits of the motor 37 from being completed until after a sufficient time has elapsed after the closing of the switch 8 to allow the generator voltage to be restored to its normal value in case it is reversed in response to the operation of the field switch 16.

When the stator of the motor 4 has been shifted so that the voltage of the generator 5 is within the range Y' and the relays 23 and 24 are simultaneously energized, an energizing circuit is completed for the closing coil 80 of the switch 10 to effect the connection of the armature winding of the generator 5 to the circuit 2.

The operation of the control arrangement shown in Fig. 1 is as follows:

When the converter 3 is to be placed in operation, the control switch 17 is closed so as to complete an energizing circuit for the operating coil 44 of the switch 7 through contacts 45 of the transfer relay 33 and the auxiliary contacts 46 of the switch 8 so that the armature winding of the motor 4 is connected to the alternating current circuit 1 through the voltage reducing means 6. The motor 4 then starts and accelerates as an induction motor to bring the frequency set up to approximately synchronous speed. By closing its auxiliary contacts 47, the switch 7 also completes an energizing circuit for the operating winding of the field switch 15 so that the generator field winding 14 is connected to a suitable source of excitation. The energizing circuit of the operating coil of the field switch 15 also includes the contacts of the control switch 17, the contacts 48 of the control relay 34 and the auxiliary contacts 49 of the field switch 16. By closing its auxiliary contacts 50, field switch 15 completes a shunt circuit around the contacts 47 of the switch 7.

When the speed of the frequency converter 3 increases above a predetermined value near synchronous speed, the frequency relay 18 closes its contacts 51 and completes an energizing circuit for the operating coil of the field switch 12 so that the motor field winding 11 is excited to pull the motor 4 into synchronism. The energizing circuit of the operating coil of the field switch 12 also includes the contacts of the control switch 17, contacts 52 of the field switch 13, auxiliary contacts 53 of the switch 7, the contacts 51 of the frequency relay 18, contacts 54 of the control relay 32, contacts 55 of the control relay 31 and contacts 56 of the relay 30.

By closing its auxiliary contacts 97, the field switch 12 completes a shunt circuit around the series connected contacts 53, 51, 54 and 55. By closing its auxiliary contacts 98, the field switch 12 completes through the contacts of the control switch 17, an energizing circuit for an associated time delay drop out relay 32. The closing of the field switch 12 also completes an energizing circuit for relay 58 through contacts of control switch 17, contacts 59 of the frequency relay 18, contacts 60 of the field switch 12 and contacts 61 of the field switch 15. By closing its contacts 62, relay 58 completes an energizing circuit for one or more of the control relays 22 to 25, inclusive, depending upon the phase relation of the generator voltage relative to the voltage of the alternating current circuit 2.

If the generator voltage is within the phase range Y of Fig. 2, a circuit is completed for relay 23 through contacts 27 of the phase responsive relay 20, the contacts 62 of the relay 58 and the contacts of the control switch 17 and also a circuit is completed for relay 24 through the contacts 28 of the phase responsive relay 21, the contacts 62 of the relay 58 and the contacts of the control switch 17. Since the generator voltage under these conditions is within the range of adjustment of the stator shifting means, the simultaneous energization of the control relays 23 and 24 completes an energizing circuit for the transfer relay 33, this energizing circuit also including the contacts of the control switch 17 auxiliary contacts 64 of the switch 8, the contacts 65 of the relay 23 and the contacts 66 of the relay 24. By opening its contacts 45, the transfer relay 33 interrupts the heretofore described energizing circuit for the closing coil 44 of the switch 7 so that the switch opens and disconnects the armature winding of the motor 4 from the circuit 1. By closing its auxiliary contacts 67, the switch 7 immediately completes through the contacts of the control switch 17 and the contacts 68 of the transfer relay an energizing circuit for the closing coil 69 of switch 8 so that the armature winding of the generator 4 is immediately connected directly to the alternating current circuit 1. By closing its auxiliary contacts 70, the switch 8 completes a shunt circuit around the auxiliary contacts 67 of the switch 7 and the contacts 68 of the transfer relay 33. By closing its auxiliary contacts 71, the switch 8 completes through the contacts 72 of the switch 10 an energizing circuit for the recalibrating relay 36 which, by closing its contacts 73 and 74, recalibrates the phase responsive relays 20 and 21 so that they have the characteristics shown in Fig. 3 and which, by closing its contacts 75, completes through the contacts of the control switch 17 and the contacts 71 of the switch 8 an energizing circuit for the time relay 38. The relay 38 is designed in any suitable manner so that it does not close its contacts 77 and 78 until after it has been energized for a predetermined time.

If the generator voltage is within the phase range Y' of Fig. 3 so that the relays 23 and 24 are also simultaneously energized when the relay 38 closes its contacts 78, a circuit is immediately completed for the closing coil 80 of the switch 10 to connect the generator 5 to the alternating current circuit 2. This energizing circuit also includes contacts of the control switch 17, the contacts 71 of the switch 8, the contacts 81 of the relay 23 and the contacts 82 of the relay 24. By closing its auxiliary contacts 83, the switch 10 completes a locking circuit for itself which is independent of the position of the relays 23, 24 and 38. By opening its auxiliary contacts 72, the switch 10 effects the deenergization of the relays 36 and 38 so that the stator shifting motor 37 may thereafter be controlled in any suitable manner, examples of which are well known in the art, to vary the load of the frequency set 3 to any desired value.

If the voltage of the generator 5 is outside of the range Y' of Fig. 3 when the relay 38 becomes energized, either the relay 23 or the relay 24 will be deenergized and a circuit will be completed thereby for the stator shifting motor 37 so that it will rotate in the proper direction to bring the generator voltage within the range Y'. If the generator voltage vector is to the right of the phase range Y', the relay 23 is deenergized and a circuit is completed through the contacts of the control switch 17, the auxiliary contacts 71 of the switch 8, the armature and field winding 84 of the motor 37, the contacts 85 of the relay 23 and the contacts 77 of the relay 38. The energization of this circuit for the motor 37 causes it to rotate the stator of the motor 4 in the proper direction to bring the generator voltage towards phase coincidence with the voltage of the circuit 2 until the generator voltage is brought within the phase range Y' of Fig. 3 when the relay 23 becomes energized to interrupt the heretofore described circuit of the motor 37 and to complete the heretofore described energizing circuit for the transfer relay 33.

If the generator voltage vector is to the left of the phase range Y', the relay 24 is deenergized and a circuit is completed through the contacts of the control switch 17, the auxiliary contacts 71 of the switch 8, the armature and field winding 86 of the motor 37, the contacts 87 of the control relay 24, and the contacts 77 of the relay 38. The completion of this circuit causes the motor 37 to rotate the stator of the motor 4 in the opposite direction so that the generator voltage is brought towards phase coincidence with the voltage of the circuit 2 until the generator voltage is brought within the phase range Y' when the relay 24 becomes energized and effects the energization of the transfer relay 33 in the manner heretofore described.

If the generator voltage is within the range X of Fig. 2, when the relay 58 becomes energized in response to the closing of the field switch 12 during the starting operation, a circuit is completed for relay 22 through contacts 26 of the phase responsive relay 20, the contacts 62 of the relay 58 and the contacts of the control switch 17, and also an energizing circuit is completed for the control relay 25 through the contacts 29 of the phase responsive relay 21, the contacts 62 of the relay 58 and the contacts of the control relay 17. Since the generator voltage is within the range of adjustment of the stator shifting means from phase opposition with respect to the voltage of the circuit 2, the simultaneous energizations of the relays 22 and 25 complete an energizing circuit for the transfer relay 33 through the contacts of the control switch 17, the auxiliary contacts 64 of the switch 8, contacts 88 of the relay 22 and the contacts 89 of the relay 25. The energization of the transfer relay 33 then effects, in the manner heretofore described, the opening of the switch 7 and the subsequent closing of the switch 8.

The closing of the auxiliary contacts 71 of the switch 8 then effects, in the manner heretofore described, the energization of the recalibrating relay 36 and also completes an energizing circuit for the control relay 34 through the contacts of the control switch 17, the contacts 71 of the switch 8, the contacts 90 of the relay 22 and the contacts 91 of the relay 25. The relay 36 has a slower operating time than the relay 34 so as to insure that the relay 34 operates before the relays 22 and 25 have time to open their contacts. By closing its contacts 92, the relay 34 completes a locking circuit for itself around the contacts 90 and 91 of the relays 24 and 25, respectively. By opening its contacts 48, the relay 34 interrupts the heretofore described circuit for the operating coil of the field switch 15 so that it opens to disconnect the field winding 14 of the generator 5 from the source of excitation. By closing its auxiliary contacts 93, the field switch 15 completes an energizing circuit for the operating winding of the reversing field switch 16 through the contacts 94 of the control relay 34, the auxiliary contacts 71 of the switch 8 and the contacts of the control switch 17. The closing of the field switch 16 connects the field winding 14 to the source of excitation so as to reverse the current through the field winding 14 and thereby cause the voltage of the generator 5 to fall within the phase range Y. By closing its auxiliary contacts 95, the field switch 16 completes a shunt circuit around the contacts 94 of the control relay 34.

The opening of the contacts 61 of the switch 15 interrupts the circuit of the control relay 58, but before this relay can open its contacts 62, a shunt circuit is completed around the contacts 61 by the contacts 96 of the switch 16 so that the relay 58 maintains its contacts 62 closed. After the switch 16 is closed and the voltage of the generator 5 has had time to build up to its normal value, the time relay 38, which is energized in response to the energization of the recalibrating relay 36, completes its timing operation and closes its contacts 77 and 78 to allow the stator shifting motor 37 and the switch 10 to be closed in the manner heretofore described.

If the voltage of the generator 5 is within the phase range Z, with respect to the voltage of the circuit 2, so that the relays 23 and 25 are simultaneously deenergized when the relay 58 operates during the starting operation, a circuit is completed for the time relay 30 through the contacts of the control switch 17, the contacts 99 of the relay 23, the contacts 100 of the relay 25, the contacts 101 of the field switch 15, the contacts 102 of the relay 58 and the contacts 103 of the field switch 12. After the relay 30 is energized for a predetermined time interval, it opens its contacts 56 in the circuit of the operating winding of the field switch 12 so that this switch opens and disconnects the source of excitation from the field winding 11 of the motor 4. The opening of the contacts 98 and 103 of the field switch 12 interrupts the heretofore described circuits for the relays 32 and 30, but since the relay 32 is a time delay drop out relay, relay 30 recloses its contacts 56 before the relay 32 opens its contacts 104. Consequently, as soon as the contacts 56 of the relay 30 are closed, an energizing circuit for the operating winding of the field switch 13 is completed through these contacts 56 and the contacts 104 of the relay 32, the contacts 105 of the field switch 12 and the contacts of the control switch 17. The closing of the field switch 13 establishes a connection between the field winding 11 and the source of excitation so that current flows through the field winding 11 in the opposite direction from what it does when the field switch 12 is closed. This reversal of excitation causes, in a well-known manner, the motor 4 to slip a pole. By closing its auxiliary contacts 106, the field switch 13 completes a shunt circuit around the contacts 104 of the relay 32, and by closing its contacts 107, the field switch 13 completes, through the contacts of the control switch 17, an energizing circuit for the associated time delay drop out relay 31. The closing of the auxiliary contacts 108 on the field switch 13 completes a shunt circuit around the contacts 60 of the field switch 12 so that the relay 58 is prevented from opening its contacts 62. The closing of the auxiliary contacts 109 on the field switch 13 completes a shunt circuit around the auxiliary contacts 103 on the field switch 12 so that, if the generator voltage is still within the range Z after the motor 4 has slipped a pole, the circuit of the relay 30 is again completed to cause this relay to operate after a predetermined time interval and open its contacts 56 so as to effect the opening of the field switch 13. By opening its auxiliary contacts 107 and 109, the field switch 13 interrupts the energizing circuits of the relays 31 and 32, but since the relay 32 is a time delay drop out relay, the relay 30 closes its contacts 56 before the relay 31 opens its contacts 111. Therefore, when the relay 30 closes its contacts 56, an energizing circuit is completed for the operating winding of the field switch 12 through these contacts 56 and the contacts 111 of the relay 31, the contacts 52 of the field switch 13 and the contacts of the control switch 17. The closing of the field switch 12 again reverses the field excitation of the motor 4 so as to cause the motor to slip another pole. In this manner the field switches 12 and 13 are alternately opened and closed after a time interval dependent upon the operation of the time relay 30 until the voltage of the generator 5 is brought within the phase range X or Y at which time the transfer relay 33 is energized, in the manner heretofore described, to effect the opening of the switch 7 and the closing of the switch 8. Then the stator shifting motor 27 and the closing of the switch 10 are controlled in the manner heretofore described.

Similarly, if the voltage of the generator 5 is within the phase range Z', with respect to the voltage of the circuit 2 so that the relays 22 and 24 are simultaneously deenergized when the relay 58 operates during the starting operation, the time relay 30 is intermittently energized to effect the alternate opening and closing of the field switches 12 and 13 until the generator voltage is brought within the phase range X or Y since the series connected contacts 112 and 113 of the relays 22 and 24, respectively, are connected in parallel with the series connected contacts 99 and 100 of the relays 23 and 25, respectively, in the heretofore described energizing circuit of the relay 30.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. A control arrangement for a frequency converter having two synchronous machines respectively adapted to be connected to different energized alternating current circuits comprising means for connecting one of said machines to one of said circuits, means dependent upon the phase relation of the voltages of the other machine and the other circuit when said one of said machines is connected to said one of said circuits for periodically reversing the excitation of said one of said machines until a predetermined phase relation of said voltages is established, and means responsive to said predetermined phase relation of said voltages for connecting said other machine to said other circuit.

2. A control arrangement for a frequency converter having two synchronous machines respectively adapted to be connected to different energized alternating current circuits comprising voltage reducing means, means for connecting one of said machines to one of said circuits through said voltage reducing means, means dependent upon the phase relation of the voltages of the other machine and the other circuit while said one of said machines is connected to said one of said circuits for periodically reversing the excitation of said one of said machines until a predetermined phase relation of said voltages is established, and means responsive to said predetermined phase relation of said voltages for connecting said one of said machines to said one of said circuits independently of said voltage reducing means and for connecting said other machine to said other circuit.

3. A control arrangement for a frequency converter having two synchronous machines respectively adapted to be connected to different energized alternating current circuits comprising means for connecting one of said machines to one of said circuits, means dependent upon the phase relation of the voltages of the other machine and the other circuit when said one of said machines is connected to said one of said circuits for periodically reversing the excitation of said one of said machines until said voltages are within a predetermined range near phase coincidence or phase opposition, and means responsive to said predetermined ranges of said voltages for reversing the excitation of said other machine if said voltages are in said predetermined range near phase opposition and for connecting said other machine to said other circuit if said voltages are in said predetermined range near phase coincidence.

4. A control arrangement for a frequency converter having two synchronous machines respectively adapted to be connected to different energized alternating current circuits comprising voltage reducing means, means for connecting one of said machines to one of said circuits through said voltage reducing means, means dependent upon the phase relation of the voltages of the other machine and the other circuit while said one of said machines is connected to said one of said circuits for periodically reversing the excitation of said one of said machines until said voltages are within a predetermined range near phase coincidence or phase opposition, and means responsive to said predetermined ranges of said voltages for connecting said one of said machines to said one of said circuits independently of said voltage reducing means and for reversing the excitation of said other machine if said voltages are in said predetermined range near phase opposition.

5. A control arrangement for a frequency converter having two synchronous machines respectively adapted to be connected to different energized alternating current circuits comprising voltage reducing means, means for connecting one of said machines to one of said circuits through said voltage reducing means, means dependent upon the phase relation of the voltages of the other machine and the other circuit while said one of said machines is connected to said one of said circuits for periodically reversing the excitation of said one of said machines until said voltages are within a predetermined range near phase coincidence or phase opposition and means responsive to said predetermined ranges of said voltages for connecting said one of said machines to said one of said circuits independently of said voltage reducing means and for reversing the excitation of said other machine if said voltages are in said predetermined range near phase opposition and for connecting said other machine to said other circuit if said voltages are in said predetermined range near phase coincidence.

6. A control arrangement for a frequency converter having two synchronous machines respectively adapted to be connected to different energized alternating current circuits comprising means for connecting one of said machines to one of said circuits, and means dependent upon the phase relation of the voltages of the other machine and the other circuit when said one of said machines is connected to said one of said circuits for periodically reversing the excitation of said one of said machines.

7. A control arrangement for a frequency converter having two synchronous machines respectively adapted to be connected to different energized alternating current circuits comprising voltage reducing means, means for connecting one of said machines to one of said circuits through said voltage reducing means, means dependent upon the phase relation of the voltages of the other machine and the other circuit while said one of said machines is connected to said one of said circuits for periodically reversing the excitation of said one of said machines until a predetermined phase relation of said voltages is established, and means responsive to said predetermined phase relation of said voltages for connecting said one of said machines to said one of said circuits independently of said voltage reducing means.

8. A control arrangement for a frequency converter having two synchronous machines respectively adapted to be connected to different energized alternating current circuits comprising means for connecting one of said machines to one of said circuits, means dependent upon the phase relation of the voltages of the other machine and the other circuit when said one of said machines is connected to said one of said circuits for periodically reversing the excitation of said one of said machines, and means responsive to said predetermined phase relation of said voltages for shifting the stator of one of said machines relative to its foundation to establish another predetermined phase relation of said voltages.

9. A control arrangement for a frequency converter having two synchronous machines respectively adapted to be connected to different energized alternating current circuits comprising means for connecting one of said machines to one of said circuits, means dependent upon the phase relation of the voltages of the other machine and the other circuit when said one of said machines is connected to said one of said circuits for periodically reversing the excitation of said one of said machines, means responsive to said predetermined phase relation of said voltages for shifting the stator of one of said machines relative to its foundation to establish another predetermined phase relation of said voltages, and means responsive to the establishment of said last mentioned predetermined phase relation of said voltages for effecting the connection of said other machine to said other circuit.

10. A control arrangement for a frequency converter having two synchronous machines respectively adapted to be connected to different energized alternating current circuits comprising voltage reducing means, means for connecting one of said machines to one of said circuits through said voltage reducing means, means dependent upon the phase relation of the voltages of the other machine and the other circuit while said one of said machines is connected to said one of said circuits for periodically reversing the excitation of said one of said machines until a predetermined phase relation of said voltages is established, and means responsive to said predetermined phase relation of said voltages for connecting said one of said machines to said one of said circuits independently of said voltage reducing means and for shifting the stator of one of said machines relatively to its foundation to establish another phase relation of said voltages.

11. A control arrangement for a frequency converter having two synchronous machines respectively adapted to be connected to different energized alternating current circuits comprising voltage reducing means, means for connecting one of said machines to one of said circuits through said voltage reducing means, means dependent upon the phase relation of the voltages of the other machine and the other circuit while said one of said machines is connected to said one of said circuits for periodically reversing the excitation of said one of said machines until a predetermined phase relation of said voltages is established, means responsive to said predetermined phase relation of said voltages for connecting said one of said machines to said one of said circuits independently of said voltage reducing means and for shifting the stator of one of said machines relatively to its foundation to establish another phase relation of said voltages, and means responsive to the establishment of said last mentioned predetermined phase relation of said voltages for effecting the connection of said other machine to said other circuit.

12. A control arrangement for a frequency converter having two synchronous machines respectively adapted to be connected to different energized alternating current circuits comprising means for connecting one of said machines to one of said circuits, means including relays responsive to the phase relations between the voltages of the other machine and the other circuit for periodically reversing the excitation of said one of said machines until a predetermined phase relation between said voltages is established, means responsive to said predetermined phase relation between said voltages for effecting a recalibration of said relays, and means controlled by said recalibrated relays for establishing a different predetermined relation between said voltages.

13. A control arrangement for a frequency converter having two synchronous machines respectively adapted to be connected to different energized alternating current circuits comprising means for connecting one of said machines to one of said circuits, means including relays responsive to the phase relations between the voltages of said other machine and the other circuit for periodically reversing the excitation of said one of said machines until a predetermined phase relation between said voltages is established, means responsive to said predetermined phase relation between said voltages for effecting a recalibration of said relays, and means controlled by said recalibrated relays for shifting the stator of one of said machines relative to its foundation so as to establish a different predetermined relation between said voltages.

14. A control arrangement for a frequency converter having two synchronous machines respectively adapted to be connected to different energized alternating current circuits comprising means for connecting one of said machines to one of said circuits, means including relays responsive to the phase relations between the voltages of said other machine and the other circuit for periodically reversing the excitation of said one of said machines until a predetermined phase relation between said voltages is established, means responsive to said predetermined phase relation between said voltages for effecting a recalibration of said relays, means controlled by said recalibrated relays for establishing a different predetermined relation between said voltages, and means responsive to the establishment of said different predetermined relation between said voltages for effecting the connection of said other machine to said other circuit.

HERMAN BANY.